US009965795B2

(12) United States Patent
Underwood

(10) Patent No.: US 9,965,795 B2
(45) Date of Patent: May 8, 2018

(54) AUTOMATIC TAB PAYMENT FROM A USER DEVICE

(71) Applicant: Verizon Patent and Licensing Inc., Basking Ridge, NJ (US)

(72) Inventor: Rosa M. Underwood, Washington, DC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1199 days.

(21) Appl. No.: 14/090,177

(22) Filed: Nov. 26, 2013

(65) Prior Publication Data
US 2014/0081778 A1    Mar. 20, 2014

Related U.S. Application Data

(63) Continuation of application No. 12/955,965, filed on Nov. 30, 2010, now Pat. No. 8,626,597.

(51) Int. Cl.
| | |
|---|---|
| *G06Q 30/00* | (2012.01) |
| *G06Q 30/06* | (2012.01) |
| *G06Q 40/02* | (2012.01) |
| *G06Q 50/12* | (2012.01) |

(52) U.S. Cl.
CPC ......... *G06Q 30/0633* (2013.01); *G06Q 30/06* (2013.01); *G06Q 30/0613* (2013.01); *G06Q 30/0617* (2013.01); *G06Q 30/0641* (2013.01); *G06Q 40/02* (2013.01); *G06Q 50/12* (2013.01)

(58) Field of Classification Search
CPC ............... G06Q 30/06; G06Q 30/0633; G06Q 30/0613; G06Q 30/0617; G06Q 30/0641
See application file for complete search history.

(56) References Cited

U.S. PATENT DOCUMENTS

| | | | | | |
|---|---|---|---|---|---|
| 5,912,743 | A | * | 6/1999 | Kinebuchi | ........... G06Q 10/087 358/442 |
| 5,960,411 | A | * | 9/1999 | Hartman | .............. G06Q 10/087 705/26.8 |
| 6,473,739 | B1 | | 10/2002 | Showghi et al. | |

(Continued)

OTHER PUBLICATIONS

Abhaya Asthana et al. "An Indoor Wireless System for Personalized Shopping Assistance", Mobile Computing System and Applications, 1994, pp. 69-74.*

(Continued)

*Primary Examiner* — Naeem U Haq

(57) ABSTRACT

A user device receives, from a server associated with a merchant, a menu of items offered for sale by the merchant. The menu permits a user, of the user device, to place an order associated with the merchant. The user device receives, from the server, information, associated with the order, that includes at least one item and a price associated with the item. The user device receives a user instruction to pay for the order and retrieves, from a memory associated with the user device, payment information to pay the price associated with the at least one item. The user device sends, to the server, the payment information to permit the server to process the payment information. The sending is performed in a manner that does not permit an attendant associated with the merchant to access the payment information. The user device receives an indication the payment information was processed.

20 Claims, 10 Drawing Sheets

(56) References Cited

U.S. PATENT DOCUMENTS

| | | | |
|---|---|---|---|
| 7,343,310 B1 * | 3/2008 | Stender | G06Q 10/10 |
| | | | 705/2 |
| 8,396,808 B2 * | 3/2013 | Greenspan | G06Q 20/10 |
| | | | 705/64 |
| 8,412,590 B2 | 4/2013 | Elliott | |
| 2002/0133418 A1 | 9/2002 | Hammond et al. | |
| 2002/0143655 A1 | 10/2002 | Elston et al. | |
| 2006/0143087 A1 | 6/2006 | Tripp et al. | |
| 2009/0125411 A1 | 5/2009 | Otto et al. | |
| 2012/0150599 A1 | 6/2012 | Isaacson et al. | |
| 2012/0150600 A1 | 6/2012 | Isaacson et al. | |

OTHER PUBLICATIONS

Asthana, et al., "An Indoor Wireless System for Personalized Shopping Assistance," Workshop on Mobile Computing Systems and Applications, http://citeseerx.ist.psu.edu/viewdoc/download-?doi=10.1.1.48.2194&rep=rep1&type=pdf, pp. 69-74, Dec. 8-9, 1994.

* cited by examiner

AUTOMATIC TAB PAYMENT FROM A USER DEVICE

CROSS-REFERENCE TO RELATED APPLICATIONS

This application is a continuation of U.S. patent application Ser. No. 12/955,965, filed on Nov. 30, 2010, the disclosure of which is hereby incorporated herein by reference in its entirety.

BACKGROUND

Computing and communication devices are capable of performing an increasing variety of functions and tasks that continue to improve the user's experience. Computing and communication devices can run a variety of applications, can connect to a variety of wired and wireless networks, can perform point of sale transactions to purchase goods and/or services, and/or can download content, which can be stored and/or displayed on the computing and communicating devices.

However, many point of sale transactions occur when a customer is located at a merchant's facility (e.g., a store, a restaurant, etc.) and/or when the customer uses a conventional form of payment, such as cash, a credit card, and/or another form of payment (e.g., a debit card, a gift card, a check, etc.), to pay for goods and/or services. Unfortunately, when using the conventional form of payment, the customer risks losing the cash, the credit card, etc. Additionally, when a non-cash-based form of payment is used, to pay for the goods and/or services, the customer usually provides a check, credit card, and/or other form of payment to the merchant, which exposes the customer to a risk associated with an unauthorized use of the credit card, identity theft, and/or an unauthorized use of bank account information associated with the customer.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods, described herein, may enable a user, of a user device, to pay for goods and/or services, received from a merchant while located at the merchant's premises (e.g., a restaurant, a store, etc.), using an automatic tab payment application (hereinafter referred to as an "autotab application") hosted by a user device. The autotab application may enable the point of sale transaction to be automatically and/or electronically performed via the user device. Alternatively, or additionally, the autotab application may enable the point of sale transaction to be performed in a manner that permits the payment information to be provided, via the user device, in a secure manner (e.g., in a manner that does not permit the merchant to have access to the payment information).

As described herein, the autotab application may enable payment information (e.g., bank account information, credit card information, etc.) to be received from the user and/or a bank associated with the user and/or stored on the user device in a secure manner. As also described herein, the autotab application may enable a user to view products and/or services associated with the merchant (e.g., menu items, such as appetizers, entrees, deserts, prices for the menu items, etc.). The autotab application may cause the user device to communicate with a network associated with the merchant in order to receive, from the network, an electronic invoice (e.g., a bill, a tab, etc.) that includes products and/or services that were selected and/or consumed by the user while at the merchant's premises. As further described herein, the autotab application may permit the invoice to be paid using the payment information, stored on the user device, in a manner that does not permit the merchant (e.g., a server, an attendant, a service agent, an attendant, a waiter/waitress, etc.) to access the payment information. The autotab application may enable a receipt to be received from the merchant that identifies the selected and/or consumed products and/or services and information confirming that the payment information was processed.

Figure 1:
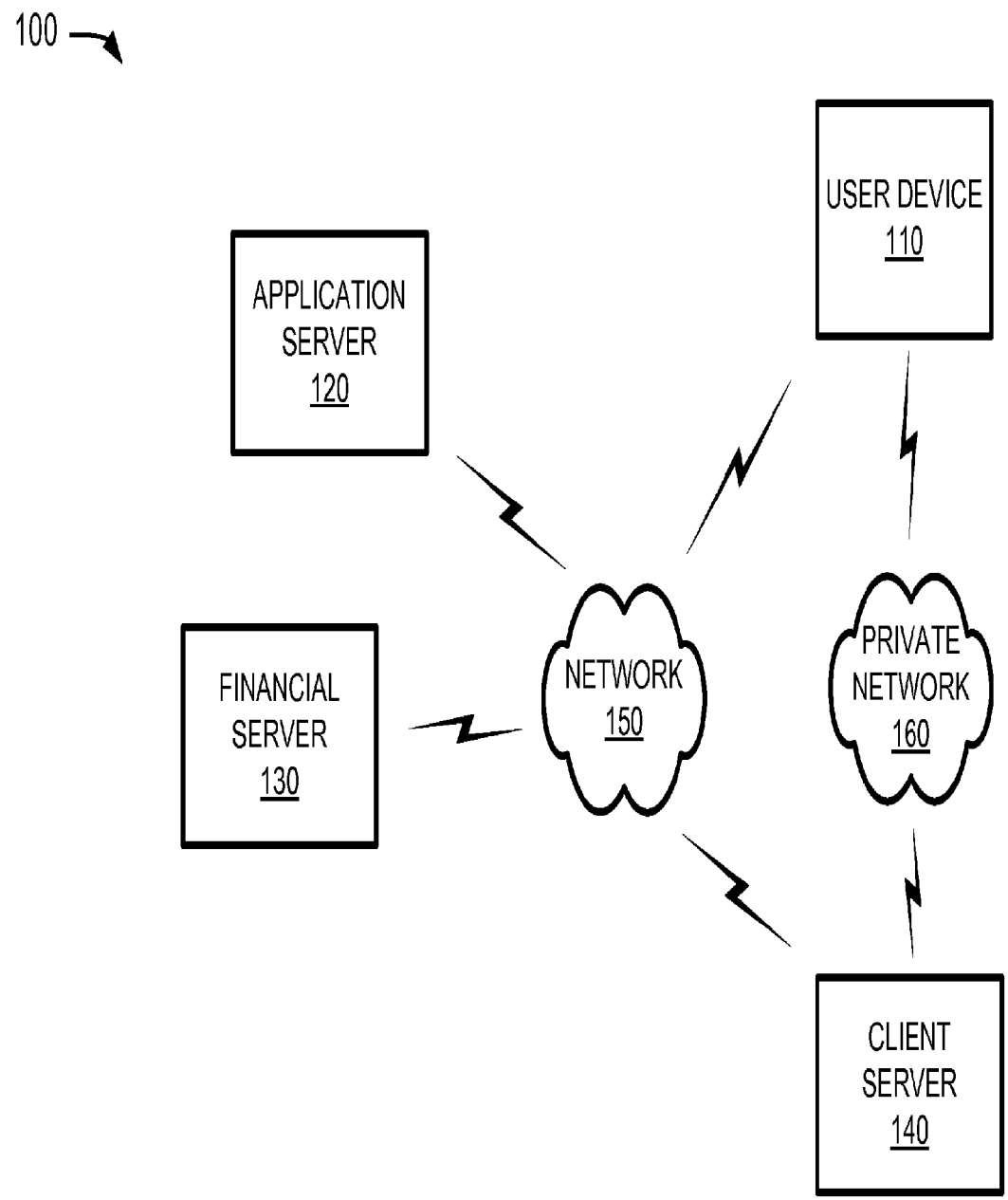
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a user device 110, an application server 120, a financial server 130, and/or a client server 140 interconnected by a network 150 and/or private network 160. The number of devices and/or networks, illustrated in FIG. 1, is provided for explanatory purposes only. In practice, there may be additional networks and/or devices, fewer networks and/or devices, different networks and/or devices, or differently arranged networks and/or devices than illustrated in FIG. 1.

Also, in some implementations, one or more of the devices of environment 100 may perform one or more functions described as being performed by another one or more of the devices of environment 100. For example, application server 120, financial server 130, and/or client server 140 may be integrated into a single device. Components of environment 100 may interconnect via wired connections, wireless connections, or a combination of wired and wireless connections.

User device 110 may include any computation or communication device, such as a wireless mobile communication device, that is capable of communicating with network 150 and/or private network 160. For example, user device 110 may include a radiotelephone, a personal communications system (PCS) terminal (e.g., such as a smart phone that may combine a cellular radiotelephone with data processing and data communications capabilities), a personal digital assistant (PDA) (e.g., that can include a radiotelephone, a pager, Internet/intranet access, etc.), a laptop computer, a personal computer, a camera, a personal gaming system, or another type of computation or communication device. In one example implementation, user device 110 may include a component to scan (e.g., using an optical and/or a radio frequency (RF) scanner) a device (e.g., a bar code, a radio frequency identification device (RFID), etc.) to obtain information. In another example implementation, user device 110 may include a global positioning satellite (GPS) component that communicates with a GPS constellation to obtain location information associated with user device 110.

In yet another example implementation, user device 110 may host an autotab application to perform automatic tab payment operations. User device 110 may communicate with application server 120 to download and/or register the autotab application. The autotab application may be used to obtain payment information (e.g., credit card information, such as a credit card number, an expiration date, a billing address, names of authorized users, etc.) from a user of user device 110. In another example, the autotab application may obtain account information (e.g., an institution name, a bank account number, a check number, a bank routing code, a password, a username, a personal identification numbers (PIN), etc.) via a communication with a server device (e.g., financial server 130) associated with a bank, financial institution, and/or other entity with which the user has an account. The autotab application may process and/or store, within user device 110, the payment and/or account information in a manner that does not permit another user to access the payment information.

User device 110 may communicate with private network 160 to perform an automatic tab payment operation. For example, user device 110 may establish a connection with private network 160 when the user, of user device 110, enters a premises of a merchant associated with client server 140 associated with private network 160 and/or comes within range of private network 160. In one example, user device 110 may communicate with client server 140, associated with the merchant, via private network 160, and may receive information associated with products and/or services associated with the merchant. In one example implementation, the user may select a product and/or service to be purchased, to check a price, and/or to check whether the selected product and/or service is in stock.

User device 110 may receive information associated with an invoice (e.g., a bill, a tab, etc.) associated with a selected product and/or service (e.g., a product and/or service offered by the merchant for purchase and/or selected via user device 110). The autotab application may present information associated with the invoice for display via an autotab payment user interface (UI), which permits the user to review the selected product and/or service, to review a cost of the selected product and/or service, to make changes (e.g., change a quantity, insert gratuity, etc.) to the order, and/or reject the purchase. The autotab application may also permit the user to pay the invoice using the payment and/or banking information securely stored on user device 110 and may transmit the payment information to client server 140. User device 110 may receive information, indicating that the payment information was processed, that includes information associated with the product and/or service purchased, the amount of the purchase, information associated with a time or date of the transaction, a transaction identifier, etc.

Application server 120 may include one or more server devices, or other types of computation or communication devices, that gather, process, search, store, and/or provide information in a manner similar to that described herein. Application server 120 may communicate via network 150. Application server 120 may transmit an autotab application to user device 110 in response to a download request received from user device 110. Application server 120 may receive a request registration from user device 110 that includes information associated with user device 110 (e.g., a device identifier, an address, etc.) and/or information associated with a user of user device 110 (e.g., a username, a password, a PIN, biometric information, etc.). Application server 120 may authenticate user device 110 based on information associated with user device 110 and/or information associated with a user of user device 110. Application server 120 may store the information associated with user device 110 and/or information associated with the user of user device 110 in a memory associated with application server 120.

Financial server 130 may include one or more server devices, or other types of computation or communication devices, that gather, process, search, store, and/or provide information in a manner similar to that described herein. Financial server 130 may communicate via network 150. In one example implementation, financial server 130 may host a website associated with a bank, financial institution, and/or other entity with which the user maintains an account from which payment for goods and/or services can be drawn. Financial server 130 may receive, from user device 110, a request for account information (e.g., an institution name, a bank account number, user address information, a bank routing code, a password, a username, a personal identification numbers (PIN), etc.). Financial server 130 may authenticate user device 110 based on the information associated with user device 110 and/or the information, associated with the user, that was received in the request. Financial server 130 may send the account information to user device 110 in response to the request.

Client server 140 may include one or more server devices, or other types of computation or communication devices, that gather, process, search, store, and/or provide information in a manner similar to that described herein. Client server 140 may communicate via network 150 and/or private network 160. In one example implementation, client server 140 may host a website and/or application that enables user device 110 to receive and/or interact with information regarding products and/or services associated with a merchant (e.g., a menu, a catalog, etc.) with which client server 140 is associated. For example, client server 140 may receive a connection request from user device 110 and may authenticate user device 110 based on information, associated with user device 110 and/or the user, that was received in the connection request. In another example implementation, client server 140 may communicate with application server 120 to determine whether user device 110 is to be authenticated.

Client server 140 may identify a location associated with user device 110 and may use information associated with the location to determine a position, within a premises associated with the merchant, that user device 110 is located. In one example implementation, the position may correspond to a particular table in a restaurant that is served by a particular server employed by the restaurant. The location information may be obtained from user device 110 (e.g., based on a GPS coordinates received from user device 110 and/or when user device 110 scans a tag associated with the position (e.g., an RFID tag, a bar code, and/or some other device associated with the particular table). Client server 140 may receive information associated with the location and/or position of user device 110 and may open an electronic invoice (e.g., a bill, a tab, etc.) associated with user device 110 (e.g., and for which the particular server is responsible for servicing).

Client server 140 may receive information associated with a selected product and/or service (e.g., menu items, such as appetizers, entrees, beverages, etc.), which may be associated with the tab and/or the position (e.g., the particular table). The information, associated with the selected product and/or service, may, for example, be received when the information is entered (e.g., via a keyboard, user interface, etc. associated with client server 140) by the merchant (e.g., by the particular server). In another example, the information associated with the selected product and/or service may be received from user device 110, via private network 160, when the user selects the product and/or service via user device 110.

Client server 140 may send the tab to user device 110 and may receive payment information from user device 110. Client server 140 may communicate with financial server 130 to process the payment information and may generate information indicating that the payment has been processed. Client server 140 may send, to user device 110, the information indicating that the payment has been processed, as an electronic receipt.

Network 150 may include one or more wired and/or wireless networks. For example, network 150 may include a cellular network, a public land mobile network (PLMN), a second generation (2G) network, a third generation (3G) network, a fourth generation (4G) network (e.g., a long term evolution (LTE) network), a fifth generation (5G) network, and/or another network. Additionally, or alternatively, network 150 may include a wide area network (WAN), a metropolitan network (MAN), a telephone network (e.g., the Public Switched Telephone Network (PSTN)), an ad hoc network, an intranet, the Internet, a fiber optic-based network (e.g., a FiOS network), and/or a combination of these or other types of networks.

Private network 160 may include one or more wired and/or wireless networks. For example private network 160 may include a local area network (LAN), a virtual private network (VPN), an ad hoc network and/or an intranet. Private network 160 may include a wired LAN and/or a wireless LAN (e.g., a Wi-Fi network).

Figure 2:
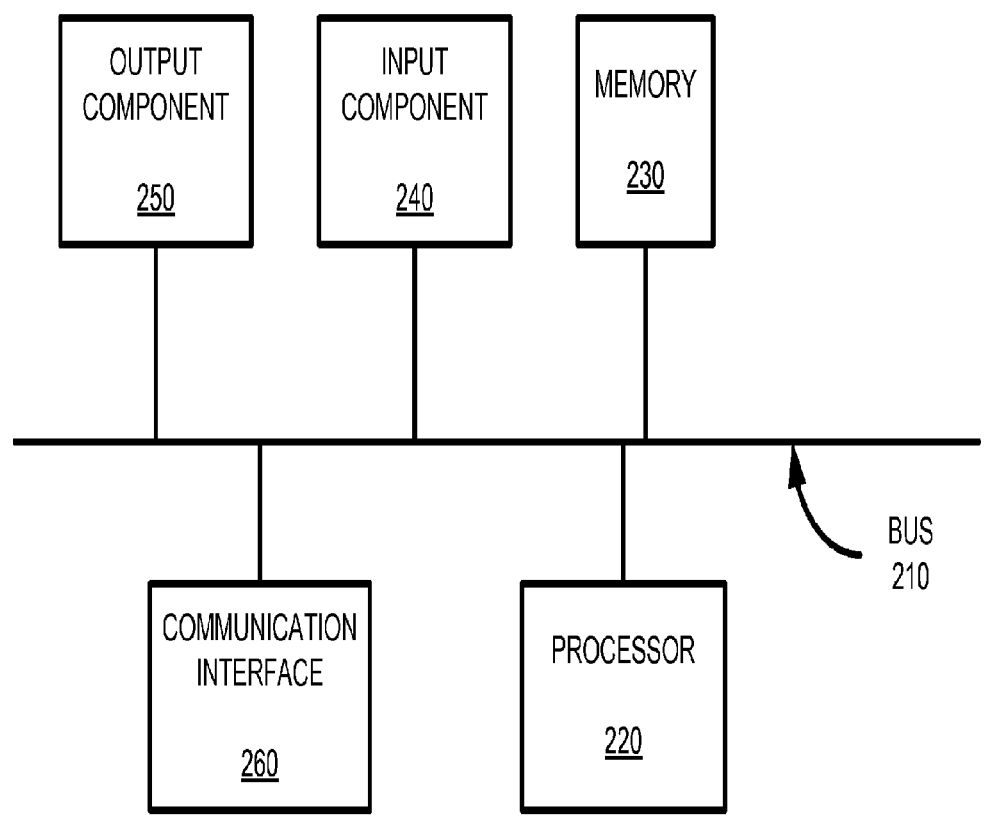
FIG. 2 is a diagram of example components of one or more of the devices of FIG. 1.

FIG. 2 is a diagram of example components of a device 200 that may correspond to application server 120, financial server 130, and/or client server 140. Device 200 may include a bus 210, a processor 220, a memory 230, an input component 240, an output component 250, and a communication interface 260. Although FIG. 2 shows example components of device 200, in other implementations, device 200 may include fewer components, additional components, different components, or differently arranged components than depicted in FIG. 2. Additionally, or alternatively, in other implementations, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions for execution by processor 220, and/or any type of non-volatile storage device that may store information for use by processor 220.

Input component 240 may include a mechanism that permits an operator to input information to device 200, such as a keyboard, a keypad, a button, a switch, etc. Output component 250 may include a mechanism that outputs information to the operator, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.) or a combination of wireless and wired communications. For example, communication interface 260 may include mechanisms for communicating with another device or system via a network, such as network 150.

As will be described in detail below, device 200 may perform operations relating to an automatic tab payment. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
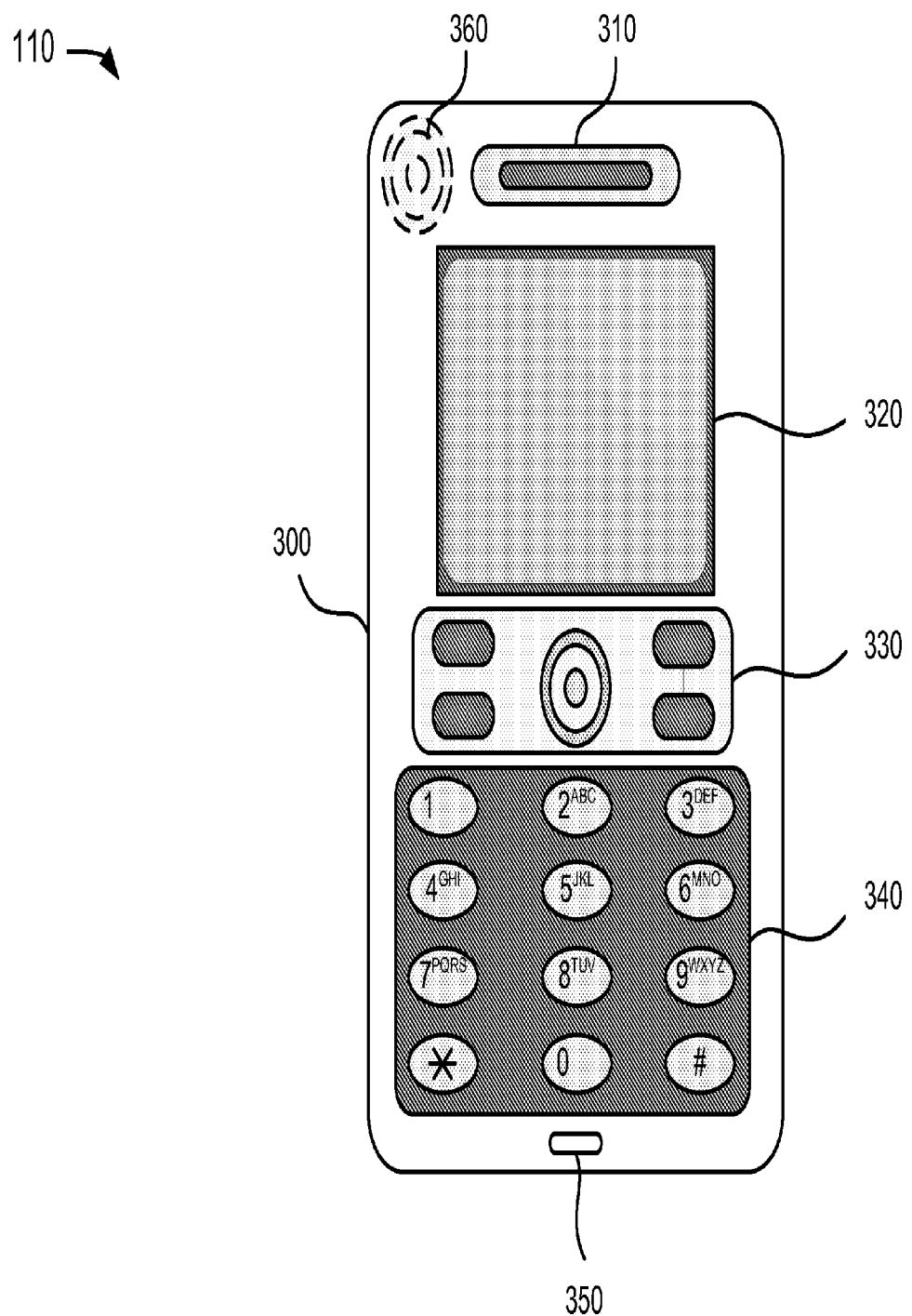
FIG. 3 is a diagram of an example user device, as shown in FIG. 1.

FIG. 3 is a diagram of an example user device 110. As shown in FIG. 3, user device 110 may include a housing 300, a speaker 310, a display 320, control buttons 330, a keypad 340, a microphone 350, and/or a camera 360. Housing 300 may include a chassis via which some or all of the components of user device 110 are mechanically secured and/or covered. Speaker 310 may include a component to receive input electrical signals from user device 110 and transmit audio output signals, which communicate audible information to a user of user device 110.

Display 320 may include a component to receive input electrical signals and present a visual output in the form of text, images, videos and/or combinations of text, images, and/or videos which communicate visual information to the user of user device 110. In one implementation, display 320 may display text input into user device 110, text, images, and/or video received from another device, and/or information regarding incoming or outgoing calls or text messages, emails, media, games, phone books, address books, the current time, etc.

Control buttons 330 may include one or more buttons that accept, as input, mechanical pressure from the user (e.g., the user presses a control button or combinations of control buttons) and send electrical signals to processor 220 that may cause user device 110 to perform one or more operations. For example, control buttons 330 may be used to cause user device 110 to transmit information. Keypad 340 may include a standard telephone keypad or another arrangement of keys.

Microphone 350 may include a component to receive audible information from the user and send, as output, an electrical signal that may be stored by user device 110, transmitted to another user device, or cause the device to perform one or more operations. Camera 360 may be provided on a front or back side of user device 110, and may include a component to receive, as input, analog optical signals and send, as output, a digital image or video that can be, for example, viewed on display 320, stored in the memory of user device 110, discarded and/or transmitted to another user device 110.

Although FIG. 3 depicts example components of user device 110, in other implementations, user device 110 may include fewer components, additional components, different components, or differently arranged components than illustrated in FIG. 3. In still other implementations, one or more components of user device 110 may perform one or more tasks described as being performed by one or more other components of user device 110.

Figure 4:
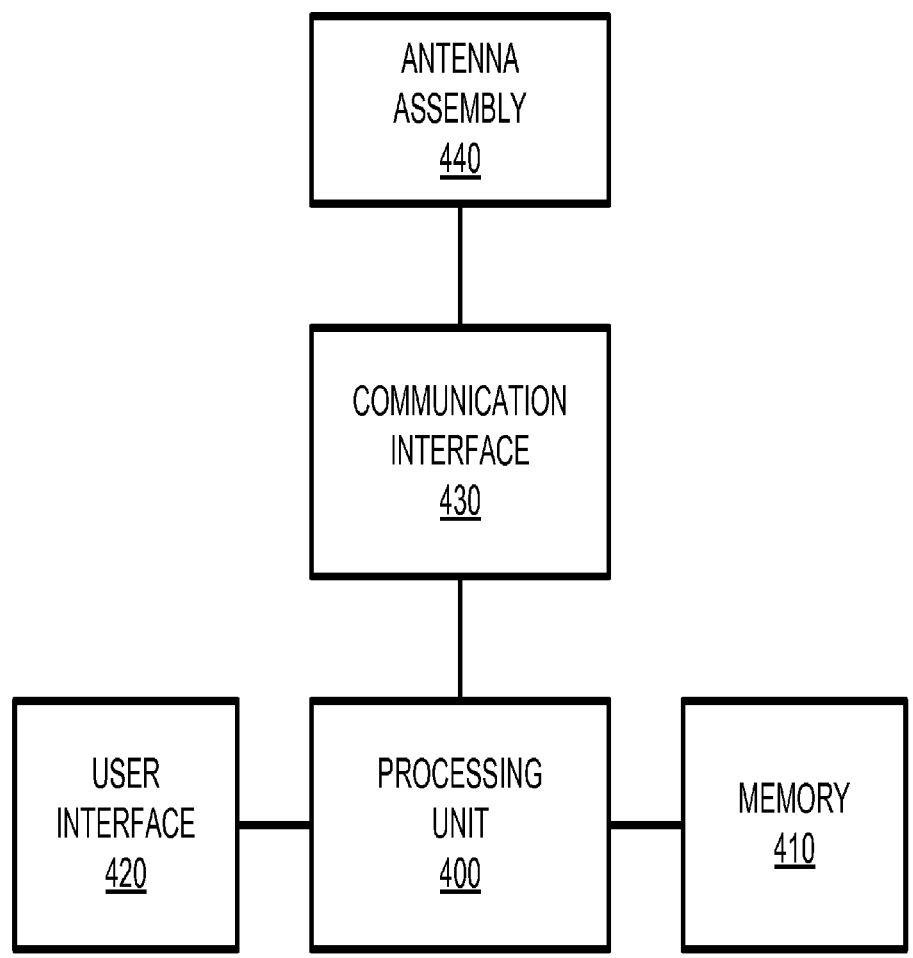
FIG. 4 is a diagram of example components of the user device of FIG. 3.

FIG. 4 is a diagram of example components of user device 110. As shown in FIG. 4, user device 110 may include a processing unit 400, a memory 410, a user interface 420, a communication interface 430, and/or an antenna assembly 440. Although FIG. 4 shows example components of user device 110, in other implementations, user device 110 may include fewer components, additional components, different components, or differently arranged components than depicted in FIG. 4. In still other implementations, one or more components of user device 110 may perform one or more tasks described as being performed by one or more other components of user device 110.

Processing unit 400 may include a processor, a microprocessor, an ASIC, a FPGA, or the like. Processing unit 400 may control operation of user device 110 and its components. In one implementation, processing unit 400 may control operation of components of user device 110 in a manner similar to that described herein. Memory 410 may include a RAM, a ROM, and/or another type of memory to store data and/or instructions that may be used by processing unit 400.

User interface 420 may include mechanisms for inputting information to user device 110 and/or for outputting information from user device 110. Examples of input and output mechanisms might include buttons (e.g., control buttons 330, keys of keypad 340, a keyboard, a joystick, etc.); a touch screen interface to permit data and control commands to be input into user device 110 via display 320; a biometric device to receive fingerprint scans, retinal scans, facial signatures, etc.; a speaker (e.g., speaker 310) to receive electrical signals and output audio signals; a microphone (e.g., microphone 350) to receive audio signals and output electrical signals; a display (e.g., display 320) to output visual information (e.g., user interfaces, web pages, etc.); a vibrator to cause user device 110 to vibrate; and/or a camera (e.g., camera 360) to receive video and/or images.

Communication interface 430 may include, for example, a transmitter that may convert baseband signals from processing unit 400 to RF signals and/or a receiver that may convert RF signals to baseband signals. Alternatively, communication interface 430 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate with a network and/or devices connected to a network (e.g., network 150, network 160, etc.).

As described in detail below, user device 110 may perform certain operations described herein in response to processing unit 400 executing software instructions of an application contained in a computer-readable medium, such as memory 410. The software instructions may be read into memory 410 from another computer-readable medium or from another device via communication interface 430. The software instructions contained in memory 410 may cause processing unit 400 to perform processes that will be described later. Alternatively, hardwired circuitry may be used in place of or in combination with software instructions to implement processes described herein. Thus, implementations described herein are not limited to any specific combination of hardware circuitry and software.

Figures 5A, 5B:
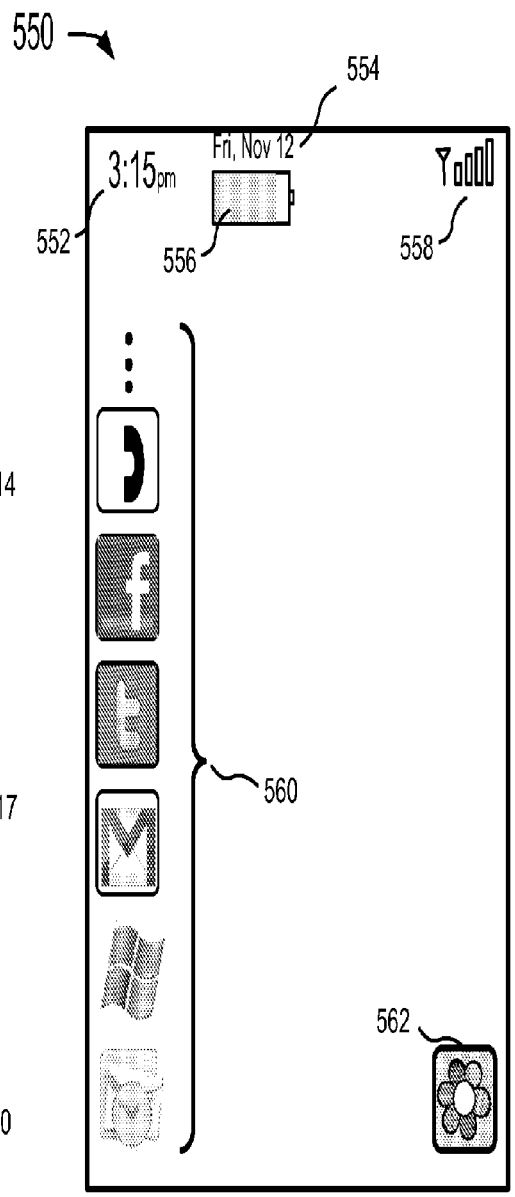
FIG. 5A is a diagram of an example automatic tab payment set up user interface that is capable of being presented on the user device of FIG. 1.
FIG. 5B is a diagram of an example desk top of the user device of FIG. 1.

FIG. 5A is a diagram of an example automatic tab payment set up user interface 500 (hereinafter referred to as "set up UI 500") that is capable of being presented on user device 110. Set up UI 500 may be presented on user device 110, by the autotab application when performing a set up operation. As shown in FIG. 5A, set up UI 500 may include a collection of fields and/or buttons, such as an enter personal information field 505, an enter credit card information field 510, a credit card type field 512, an add button 514, a download bank information field 515, an add button 517, a security information field 520, a save button 525, and an edit button 530. Set up UI 500, of FIG. 5A, includes fields and/or buttons 505-530 for explanatory purposes. In practice, set up UI 500 may include additional fields and/or buttons, fewer fields and/or buttons, different fields and/or buttons, and/or differently arranged fields and/or buttons than are described with respect to set up UI 500.

Enter personal information field 505 may permit a user, of user device 110, to enter personal information associated with the user. For example, the user may enter a name, an address, an email address, a telephone number and/or other personal information into enter personal information field 505. Enter credit card information field 510 may permit the user to enter information associated with a credit card to be used to pay for goods and/or services using the autotab application. For example, a user may enter, into enter credit card information field 510, a credit card type (e.g., using a pull down menu associated with credit card type field 512 to select the credit card type, such as VISA®, Mastercard®, etc.), a credit card number, a credit card expiration date, a name printed on the credit card, a billing address associated with the credit card and/or other information associated with the credit card. Add button 514 may permit the user to add information associated with another credit card.

Download bank information field 515 may permit the user to enter a website address associated with a financial institution from which account information and/or credit card information can be obtained. For example, the user may enter an address associated with a website from which information associated with a bank account, from which funds can be drawn, to pay for goods and/or services. In another example, the user may enter an address associated with a website corresponding to a financial institution, that issued another credit card, from which information associated with the other credit card can be obtained to pay for goods and/or services. Add button 517 may permit the user to enter an address associated with another website that corresponds to another bank and/or financial institution. Security information field 520 may permit the user to enter security information associated with the user. For example, the user may enter a username, a password, and/or other security information (e.g., a PIN, an answer to a security question, etc.). Save button 525 may permit a user to save set up information in a memory associated with user device 110. Edit button 530 may permit a user to edit the set up information after the set up information has been saved.

Other features may be set up by a user, of user device 110, that are not shown in set up UI 500. For example, a user may specify a maximum price that may be paid by the autotab application using payment information (e.g., bank information, credit card information, etc.) specified via set up UI 500. In another example, the user may identify another authorized user, associated with another user device 110, that is permitted to pay a tab using a copy of the payment information stored on the other user device 110. In this example, the user may specify a maximum price, associated with the other authorized user, for which the copy of the payment information can be used to pay a tab. Another autotab application, hosted by the other user device 110, may send a notification (e.g., as an email message, an instant message, and/or a call) to user device 110 notifying the user that the other user is attempting to purchase a good or service associated with a price that is greater than the maximum price authorized for the other user. The autotab application may display the notification, which may permit the user to approve or disapprove the transaction.

In yet another example, the user may enable a feature, via set up UI 500, that permits a user to disable the autotab application and/or erase the payment information, personal information, etc. in the event that user device 110 is lost and/or stolen.

FIG. 5B is a diagram of an example desk top 500 of user device 110. Desk top 500 may be presented on display 320 (FIG. 3). As shown in FIG. 5B, desk top 550 may include a time data item 552, a date data item 554, a battery state data item 556, a signal strength data item 558, one or more application icons 560, and an autotab icon 562. Desk top 550, of FIG. 5B, includes data items and/or icons 552-562 for explanatory purposes. In practice, desk top 550 may include additional data items and/or icons, fewer data items and/or icons, different data items and/or icons, and/or differently arranged data items and/or icons than are described with respect to desk top 550.

Time data item 552 may indicate a time (e.g., 3:15 pm) and date data item 554 may indicate a date (e.g., Fri, November 12). Battery state data item 556 may indicate a relative quantity of charge associated with a battery from which user device 110 obtains power. Signal strength data item 558 may indicate a relative signal strength and/or signal quality being received by user device 110. Application icons 560 may include icons associated with applications hosted by user device 110. For example, icons 560 may enable a user, of user device 110, to open an application (e.g., Facebook®, Twitter®, Outlook®, etc.) by selecting one or more icons 560 (e.g., by touching the one or more of icons 560 via a touch screen associated with display 320, by pressing one or more buttons on keypad 340 or control buttons 330 (FIG. 3), etc.) associated with the application.

Autotab icon 562 may correspond to payment information stored in a memory associated with user device 110, which may be used to pay a tab associated with an automatic tab payment operation. For example, the user may select autotab icon 562 to access payment information stored in the memory to be used to pay a tab using the autotab application and/or to update payment information stored in the memory as part of an autotab application set up operation. While autotab icon 562 is shown, in FIG. 5B, as a flower design with one or more visual patterns (e.g., stripes, colors or shades, polka dots, etc.), in other implementation, autotab icon 562 may be a design other than the flower design and/or may include fewer visual patterns, additional visual patterns, different visual patterns and/or differently arranged visual patterns. In one example, for security purposes, autotab icon 562 may include a generic and/or innocuous design and/or visual pattern that does not appear to be associated with the autotab application and/or payment information. In another example, autotab icon 562 may include a design and/or visual pattern that appears to be visually associated with the autotab application and/or payment information.

Figure 6:
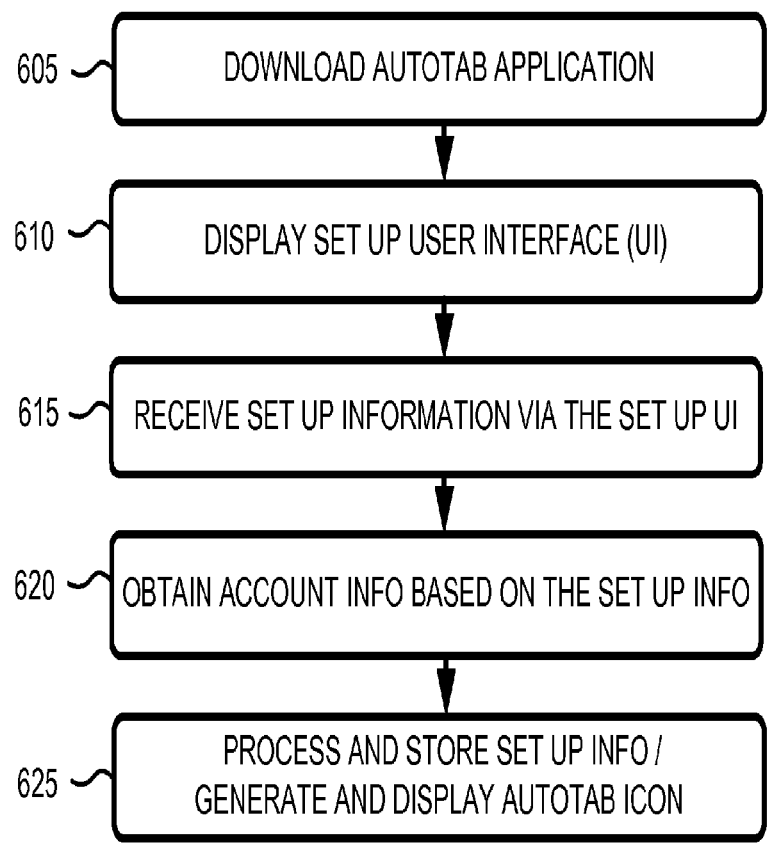
FIG. 6 is a flow chart of an example process for setting up an automatic tab payment application on the user device of FIG. 1.

FIG. 6 is a flow chart of an example process 600 for setting up an autotab application on user device 110. In one example implementation, process 600 may be performed by user device 110. In another example implementation, some or all of process 600 may be performed by a device or collection of devices separate from, or in combination with, user device 110.

As shown in FIG. 6, process 600 may include downloading an autotab application (block 605) and displaying a set up UI (block 610). For example, user device 110 may, in response to a request from a user, of user device 110, communicate with application server 120 to download an autotab application. Application server 120 may receive the request and may send the autotab application to user device 110.

User device 110 may receive the autotab application and may store and/or install the application in a memory associated with user device 110. User device 110 may present a set up UI (e.g., set up UI 500 of FIG. 5A) for display on user device 110.

In another example implementation, application server 120 may obtain information associated with user device 110 (e.g., a device identifier, a device address, etc.) and/or information associated with the user (e.g., a name, a username, a password, a PIN, an address, etc.). Application server 120 may, for example, use the information associated with user device 110 and/or the information associated with the user to register user device 110 and/or the autotab application. The registration may permit the user to download, at a later point in time, updates to the autotab application and/or to download information associated with products and/or services offered by merchants.

As also shown in FIG. 6, process 600 may include receiving set up information via the set up UI (block 615). For example, the user may enter set up information into fields associated with the set up UI (e.g., set up UI 500 of FIG. 5A). The user may, for example, enter personal information associated with the user (e.g., a name, a home address, an email address, a telephone number, etc.) into the set up UI. The user may also enter credit card information (e.g., by specifying a credit card type and/or entering a credit card number, an expiration date, a billing address, and/or other credit card information) into the set up UI. The user may, in another example, enter an address associated with a website that corresponds to a bank and/or financial institution at which an account is maintained by the user. The user may also enter security information associated with the user (e.g., a username, a password, etc.), into the set up UI. User device 110 may receive the set up information that was entered into the set up UI, when the user selects a save button (e.g., save button 525 of FIG. 5A) associated with the set up UI.

As further shown in FIG. 6, process 600 may include obtaining account information based on the set up information (block 620). For example, the autotab application may cause user device 110 to communicate with a server device (e.g., financial server 130) that hosts a website that corresponds to a bank and/or financial institution with which the user maintains an account. The autotab application may use the address, obtained from the set up information, to establish the communication with the server device associated with the bank and/or financial institution. The autotab application may send, to the server device, a request for information corresponding to account associated with the user. For example, when sending the request, the autotab application may provide, to the server device, information associated with user device 110 (e.g., a device identifier, a device address, etc.) and/or information associated with the user (e.g., personal information associated with the user, security information associated with the user, etc.) obtained from the set up information.

The server device may receive the request and may use the information associated with the user and/or user device 110 to authenticate user device 110. Based on an authentication of user device 110, the server device may send the information corresponding to the account to user device 110 and user device 110 may receive the information corresponding to the account. In one example implementation, the information corresponding to the account may include information associated with a bank account (e.g., a name associated with an institution where the account is maintained, an account number, a billing address, a bank routing number, one or more names of users that are authorized to access the account, etc.). In another example implementation, the information corresponding to the account may include credit card information (e.g., credit card type, credit card number, expiration date, etc.) corresponding to a credit card associated with the user. If, however, the server device is not able to authenticate user device 110, then the server device may not provide the information, corresponding to the account, to user device 110.

As yet further shown in FIG. 6, process 600 may include processing and/or storing the set up information and generating and/or displaying an autotab icon (block 625). For example, the autotab application may process the set up information and/or the information corresponding to the account associated with the user. When processing the set up information and/or the information corresponding to the account, the autotab application may encrypt, scramble, encode and/or otherwise convert the set up information and/or the information corresponding to the account into a format that cannot be accessed, copied, and/or edited by another user or used by any other application other than the autotab application. Alternatively, and/or additionally, the autotab application may store, as payment information, the processed set up information and/or information corresponding to the account in a memory associated with user device 110. The autotab application may generate an icon (e.g., autotab icon 562 of FIG. 5B) associated with the stored payment information and may display the autotab icon on a desktop (e.g., desktop 550 of FIG. 5B) associated with user device 110.

Figure 7A:
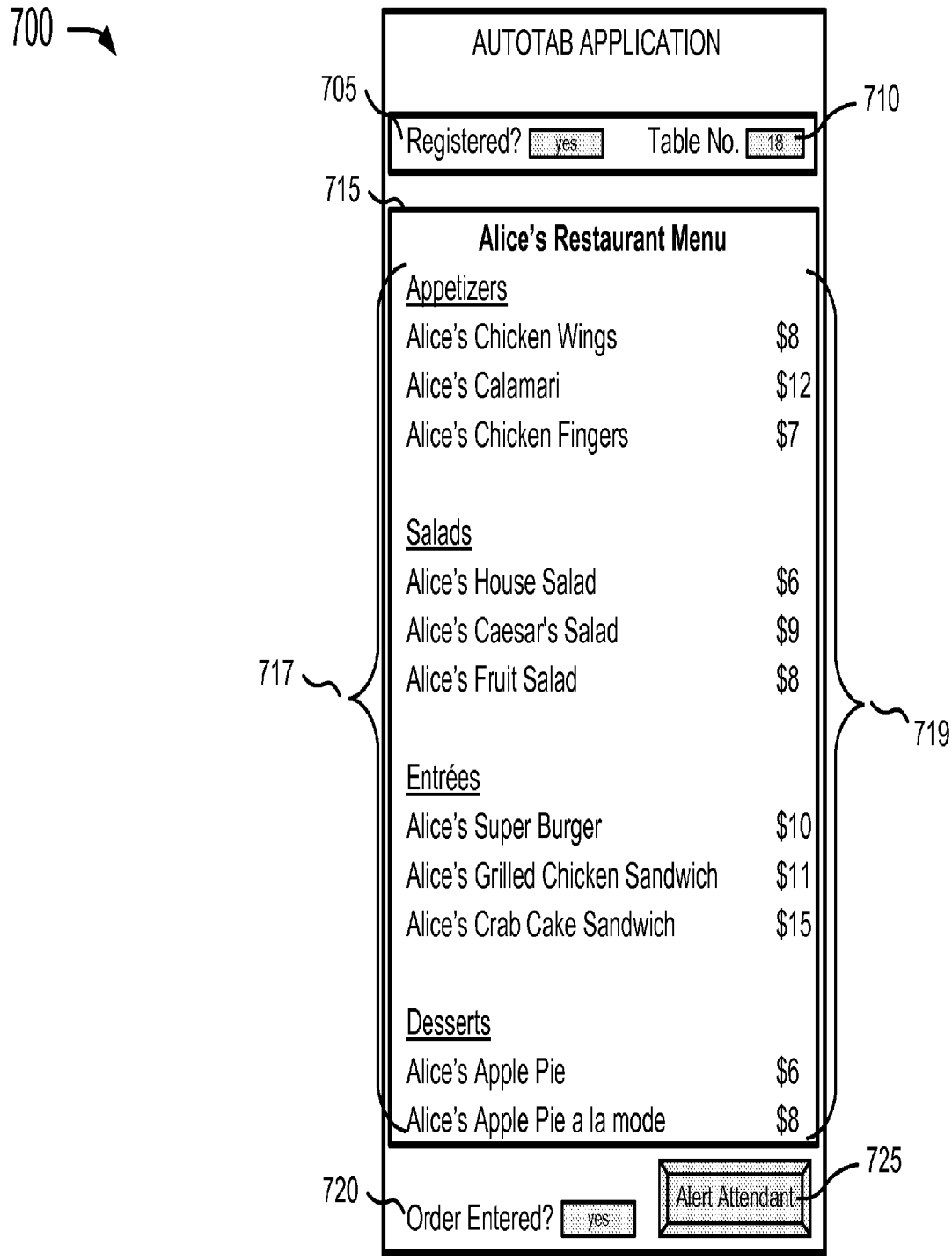
FIGS. 7A-7C are diagrams of example automatic tab payment user interfaces, associated with an automatic tab payment operation, that are capable of being presented on the user device of FIG. 1.
Figure 7B:
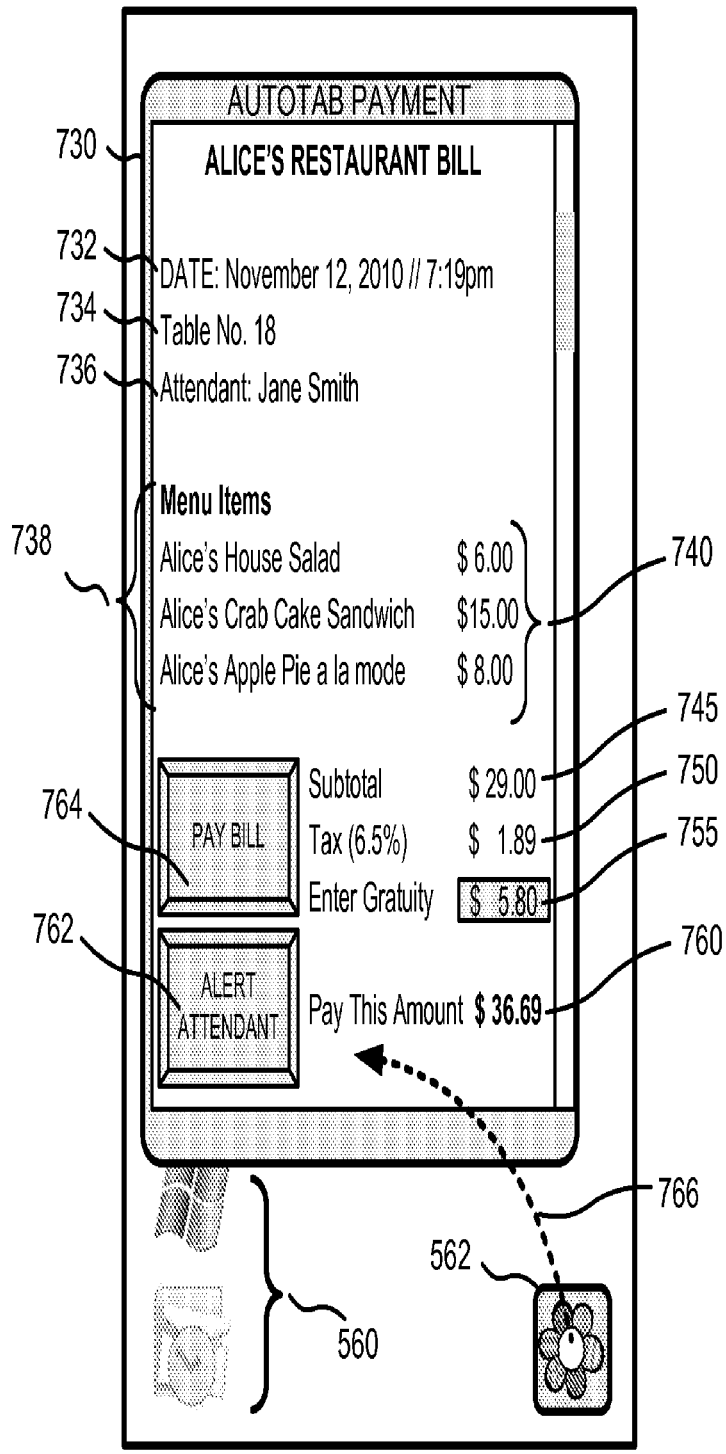
Figure 7C:
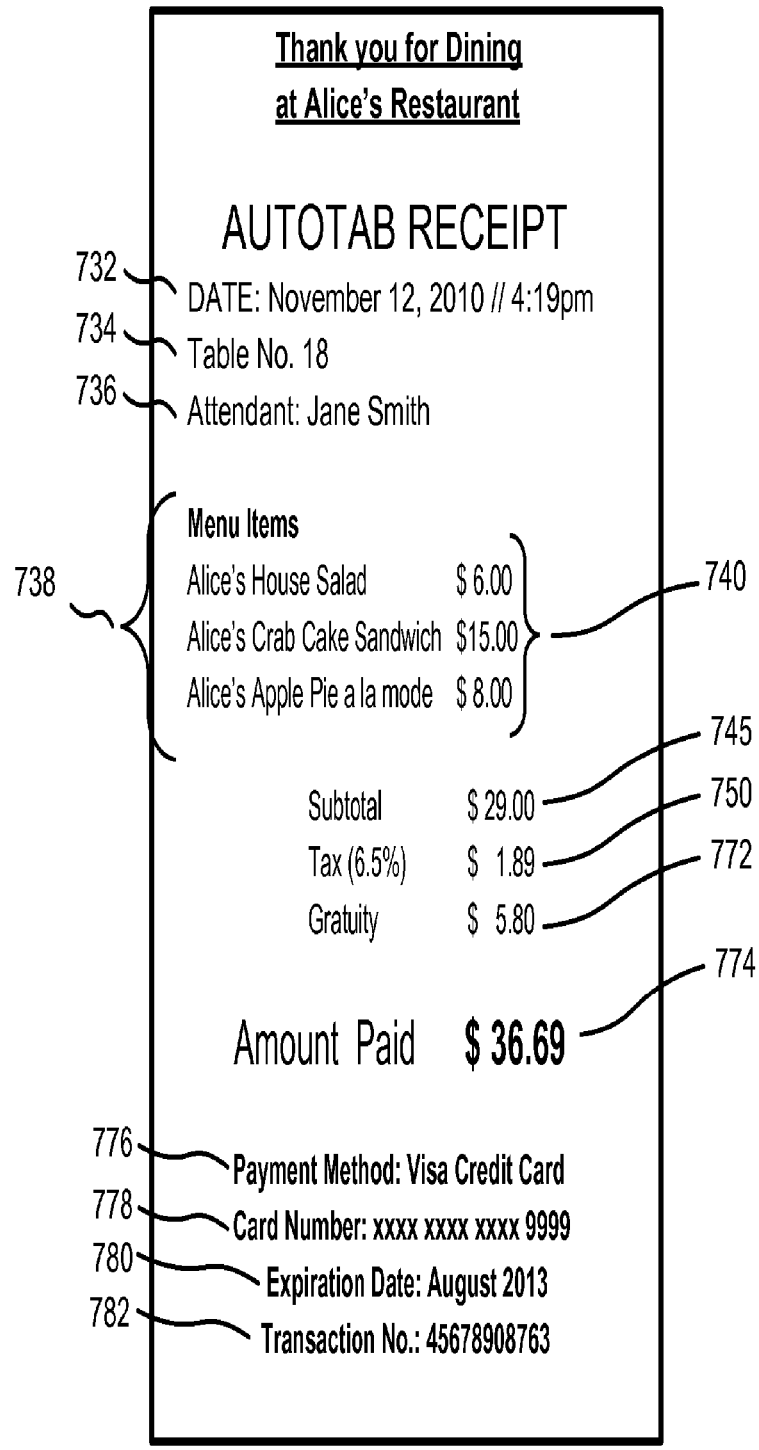

FIGS. 7A-7C are diagrams of example autotab application UIs 700, 730, and 770, respectively, associated with an automatic tab payment operation that are capable of being presented on user device 110. Autotab application UIs 700, 730, and 770 may be presented on user device 110, by the autotab application, when performing an automatic tab payment operation. While autotab application UIs 700, 730, and 770 are shown as being associated with a merchant that is a restaurant (e.g., Alice's Restaurant), in other implementations, UIs 700, 730, and 770 may be associated with a merchant that is other than a restaurant (e.g., a store, a sporting event, etc.).

As shown in FIG. 7A, autotab menu UI 700 may include a collection of fields, data items, and/or buttons, such as a registration (e.g., shown as "registered?") field 705, a table number (No.) field 710, a menu data item 715, a menu items data item 717, a menu item prices data item 719, an order status (e.g., shown as "order entered?") field 720, and an alert attendant button 725. Autotab menu UI 700, of FIG. 7A, includes fields, data items, and/or buttons 705-725 for explanatory purposes. In practice, autotab menu UI 700 may include additional fields, data items, and/or buttons; fewer fields, data items, and/or buttons; different fields, data items, and/or buttons; and/or differently arranged fields, data items, and/or buttons than are described with respect to autotab menu UI 700.

Registration field 705 may include an indication of whether user device 110 is registered with a network associated with a merchant. For example, the autotab application may cause registration field 705 to display an indicator (e.g., yes) indicating that user device 110 is registered with a network (e.g., private network 160) associated with the merchant (e.g., Alice's Restaurant) or another indicator (e.g., no) when user device 110 is not registered with the network. Table number (No.) field 710 may include an indication of a location, station, and/or table identifier, associated with the merchant, that is associated with user device 110 as a result of registering with the network. Menu data item 715 may include information relating to a menu associated with the merchant. For example, user device 110 may receive, from client server 140 and via the network (e.g., private network 160), information relating to a menu associated with the merchant as a result of registering user device 110. The autotab application may display the information associated with the menu as menu data item 715.

Menu data item 715 may include menu items data item 717 and/or menu item prices data item 719. For example, menu items data item 717 may include a list of menu items that identify a variety of cuisine that the merchant may prepare and/or serve upon request, such as appetizers (e.g., Alice's Chicken Wings, etc.), salads (e.g., Alice's House Salad, etc.), entrees (e.g., Alice's Super Burger, etc.), desserts (e.g., Alice's Apple Pie, etc.). Menu item prices data item 719 may, for example, include prices that correspond to each menu item. Order status field 720 may identify whether an order has been entered by an attendant. For example, the autotab application may cause order status field 720 to display an indicator (e.g., yes) indicating that an order, associated with user device 110, has been entered by an attendant or another indicator (e.g., no) when the order has not yet been entered by the server. Alert attendant button 725 may permit the user to notify an attendant in order to obtain service from the service. For example, the user may desire to change an order placed with the server and may alert the server of the changed order by selecting, via autotab menu UI 700, alert attendant button 725.

User device 110 may initiate an automatic tab payment operation when a user, of user device 110, enters a premises associated with the merchant. For example, the user may enter the premises associated with the merchant and may connect with (e.g., by synching with) private network 160 associated with the merchant. The autotab application may send information associated with user device 110, location information associated with user device 110, and/or information associated with the autotab application (e.g., an application identifier, etc.) to client server 140, via private network 160, that enables client server 140 to register user device 110. In another example, the user may use user device 110 to scan a bar code, an RFID tag, and/or some other device associated with a table, within the premises, to obtain information associated with the table and/or an attendant associated with the table. User device 110 may send the information associated with the table obtained from the scan (e.g., a barcode number and/or information associated with the table) to client server 140 via private network 160.

Client server 140 may register user device 110 based on the information received from user device 110 and may open a tab associated with user device 110 and/or send an indication that user device 110 is registered. User device 110 may receive the indication and the autotab application may indicate, via autotab menu UI 700, that user device 110 is registered (e.g., by displaying "yes" in registration field 705). Additionally, or alternatively, the indication may include information associated with the table (e.g., table 18) with which user device 110 is associated as a result of the registration (e.g., by displaying "18" in table field 710). Client server 140 may send information relating to a menu associated with the merchant (e.g., Alice's Restaurant) to user device 110 and the auto application may present the information relating to the menu as menu data item 715. The user may select menu items, from the list of menu items displayed via autotab menu UI 700, and an attendant, associated with the merchant, may enter the selected menu items into a restaurant application, associated with the merchant, that is hosted by client server 140. Client server 140 may receive the selected menu items and may send an indication to user device 110 that an order, associated with table 18 has been placed. User device 110 may receive the indication and the autotab application may indicate, via autotab menu UI 700, that the order has been placed (e.g., by displaying "yes" in order status field 720).

In another example implementation, the user may select the menu items via autotab menu UI 700 (e.g., by touching one or more menu items displayed via menu items data item 717 and/or by pressing a button or series of buttons on user device 110). The autotab application may receive the selection (e.g., via autotab menu UI 700) and may send information associated with the selected menu items to client server 140. Client server 140 may receive the selected menu items and may send the indication, to user device 110, that the order has been placed and/or entered.

As shown in FIG. 7B, autotab payment UI 730 may include a collection of fields, data items and/or buttons, such as a date data item 732, a table number (e.g., "No.") data item 734, an attendant data item 736, a selected menu items data item 738, a selected menu prices data item 740 (hereinafter referred to as "prices data item 740"), a subtotal data item 745, a tax data item 750, a gratuity field 755, a pay this amount data item 760, an alert attendant button 762, and a pay bill button 764. Autotab payment UI 730, of FIG. 7B, includes fields, data items, and/or buttons 732-764 for explanatory purposes. In practice, autotab payment UI 730 may include additional fields, data items, and/or buttons; fewer fields, data items, and/or buttons; different fields, data items, and/or buttons; and/or differently arranged fields, data items, and/or buttons than are described with respect to autotab payment UI 730.

Date data item 732 may identify a date and/or time that corresponds to the automatic tab payment operation. For example, the date and/or time may correspond to a time that user device 110 entered the premises associated with the merchant (e.g., detected private network 160), connected with private network 160, registered with private network 160, entered an order with client server 140, provided payment information, completed a point of sale transaction associated with selected menu items, and/or another date and/or time. Table number data item 734 may identify a table with which user device 110 is registered. Server data item 736 may include information corresponding to an attendant (e.g., a name, an attendant identifier, etc.) associated with the merchant and/or with which user device 110 is registered. Selected menu items data item 738 may identify the menu items selected, from the list of menu items, by the user. For example, user device 110 may receive an indication, from client server 140, that an order has been placed (e.g., the order that includes the selected menu items) and the autotab application may display, via autotab payment UI 730, the selected menu items as selected menu items data item 738. Selected prices data item 740 may identify a respective price for each of the selected menu items.

Subtotal data item 745 may identify a sum of the selected prices that correspond to the selected menu items. For example, the autotab application may receive or determine a sum associated with the selected prices and may display the sum as subtotal data item 745. Tax data item 750 may identify a quantity of tax associated with the subtotal. For example, the autotab application may receive or determine the quantity of tax based on a product of a tax rate and the subtotal and may display the quantity of tax and/or a tax rate as tax data item 750. The tax rate may be entered by the user, received from client server 140, and/or obtained from financial server 140 which enables a tax rate to be determined based on location information associated with user device 110. Gratuity field 755 may permit the user to enter a quantity of gratuity associated with the order. Pay this amount data item 760 may identify a value that corresponds to a total quantity of payment, associated with the order, to be paid by the user. For example, the autotab application may identify a total quantity of payment associated with the order based on a sum of the selected menu items, the quantity of tax, and the quantity of gratuity entered by the user.

Alert attendant button 762 may permit the user to notify the server that there is a mistake associated with the order and/or that the user desires to change the order. Pay bill button 764 may permit the user to automatically and/or electronically submit payment information in order to pay for the order (e.g., based on the grand total). For example, the user may select, via autotab payment UI 730, pay bill button 764 and the autotab application may retrieve payment information from a memory associated with user device 110. The autotab application may, for example, process the payment information by decrypting the payment information. In one example, the autotab application may display a notification (not shown in FIG. 7B), via autotab payment UI 730, requesting that the user confirm that payment information is to be sent in order to pay for the order. In another example, the autotab application may request that the user enter credentials (e.g., a username, a password, a PIN, a secret code, biometric information, etc.) in order to confirm that payment information is to be sent.

In one example implementation, the autotab application may send the payment information to client server 140 in order for payment to be processed. Client server 140 may, for example, receive the payment information and may process the payment information by communicating with financial server 130 associated with a financial institution responsible for processing the payment information. In another example implementation, the autotab application may send the payment information to financial server 130 associated with the financial institution in order for payment to be processed. Financial server 130 may receive the payment information, may process the payment information, and may send a notification to client server 140 indicating that the payment information was successfully processed.

In yet another example implementation, payment for the order may be performed in another way. For example, the user may instruct the autotab application to use the payment information to pay for the order by selecting autotab icon 562, from desktop 550 (FIG. 5B) and moving, as indicated by indication 766, autotab icon 562 to a location that coincides with autotab payment UI 730. Autotab icon 562 may be selected and/or moved by clicking and/or dragging (e.g., by touching and/or sliding) icon 562 using a finger, a pointing device, etc. The autotab application may receive the instruction and may send the payment information to client server 140 and/or financial server 130 to be processed in a manner similar to that described above.

Client server 140 may receive a notification from financial server 130 that the payment information was processed and may send information associated with a payment receipt to user device 110. User device 110 may receive the information associated with the payment receipt and the autotab application may display the information associated with the payment receipt via an autotab receipt UI (e.g., autotab receipt UI 770 of FIG. 7C).

As shown in FIG. 7C, autotab receipt UI 770 may include a collection of data items, such as data items 732-750 (FIG. 7B), as well as a gratuity data item 772, an amount paid data item 774, payment method data item 776, a card number data item 778, an expiration date data item 780, and a transaction number (e.g., No.) data item 782. Autotab receipt UI 770, of FIG. 7C, includes data items 732-750 and data items 772-782 for explanatory purposes. In practice, autotab receipt UI 770 may include additional data items, fewer data items, different data items, and/or differently arranged data items than are described with respect to autotab receipt UI 770.

Gratuity data item 772 may include a quantity of gratuity entered by a user of user device 110 via autotab payment UI 730 of FIG. 7B. Amount paid data item 774 may include a quantity of payment processed by financial server 130 and/or client server 140. For example, user device 110 may receive information associated with the payment receipt from financial server 130 and/or client server 140, which indicates a quantity of payment, associated with the order, that was processed. The autotab application may display the quantity of payment that was processed via amount paid data item 774.

Payment method data item 776 may identify a method of payment used to process the payment. For example, the autotab application may obtain, from the information associated with the payment receipt, information associated with a credit card type (e.g., VISA®, Mastercard®, etc.), an indication that a bank account was used, and/or an indication of another method of payment was used (e.g., a debit card type, etc.) to process the payment. Account number data item 778 may identify a credit card number, a bank account number, a bank routing number, etc. that was used to process the payment. The method of payment, the credit card number, the bank account number, the routing number, etc. may be obtained, by the autotab application, from the information associated with the payment receipt that was received from client server 140 and/or financial server 130. Expiration date data item 780 may identify an expiration date associated with a credit card, debit card and/or other method of payment. Transaction number data item 782 may include an identifier corresponding to a point of sale transaction that was performed when the payment information was processed. For example, the autotab application may receive the information associated with the payment receipt from client server 140 and/or financial server 130 and may obtain the identifier (e.g., a transaction number, a confirmation number etc.) corresponding to the point of sale transaction for display as transaction number data item 782.

For example, user device 110 may receive information associated with a payment receipt from financial server 130 and/or client server 140 and the autotab application may display the information associated with the payment receipt via autotab receipt UI 770. For example, autotab receipt UI 770 may include a date (e.g., Nov. 12, 2010) and/or time (e.g., 4:19 pm) when the payment information was processed (e.g., shown by date field 732). Autotab receipt UI 770 may include a table number (e.g., 18, as shown by table number field 734) and/or a name associated with the server (e.g., Jane Smith as shown by server field 736). Autotab receipt UI 770 may include the selected menu items (e.g., Alice's house salad, Alice's crab cake sandwich, and/or Alice's apple pie as shown by selected menu items field 738) and prices associated with the selected menu items (e.g., $6.00, $15.00, and/or $8.00, respectively, as shown by selected prices data item 740).

Autotab receipt UI 770 may also include a subtotal value (e.g., $29.00 as shown by subtotal data item 745), a quantity of tax (e.g., $1.89) based on a tax rate (e.g., 6.5 percent, as shown by tax data item 750), a quantity of gratuity (e.g., $5.80 as shown by data item 772), and/or an amount paid (e.g., $36.69 as shown by amount paid data item 774).

Autotab receipt UI 770 may further include a payment method (e.g., Visa credit card, as shown by payment method data item 776), a card number associated with the method of payment (e.g., xxxx xxxx xxxx 9999, as shown by account number data item 778), an expiration date (e.g., August 2013, as shown by expiration date data item 780) and/or a transaction number (e.g., 456789808763, as shown by transaction number data item 782.

Figure 8:
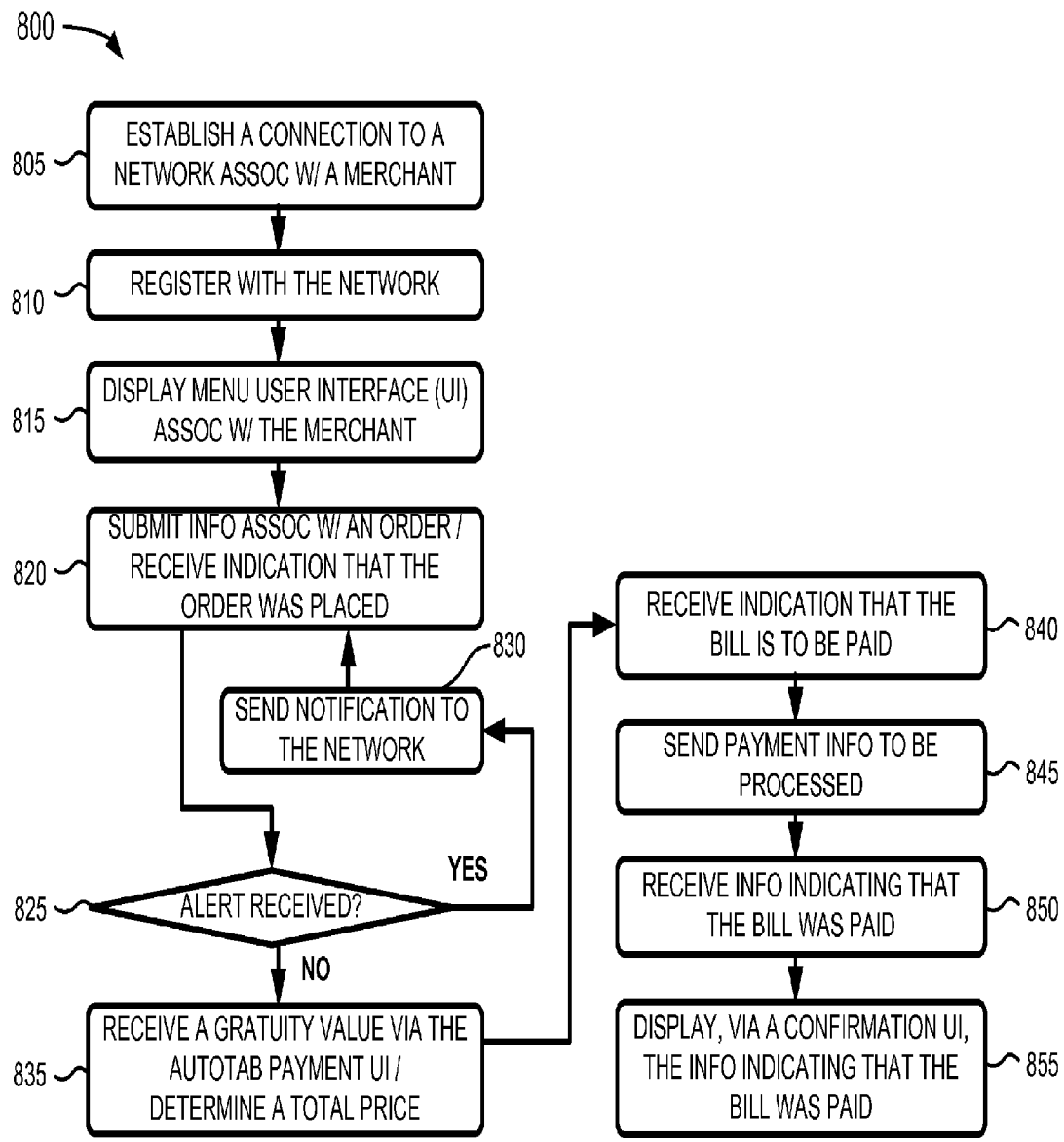
FIG. 8 is a flow chart of an example process for using an automatic tab payment application to perform an automatic tab payment operation according to an implementation described herein.

FIG. 8 is a flow chart of an example process 800 for using an autotab application to perform an automatic tab payment operation. In one implementation, process 800 may be performed by user device 110. In another implementation, some or all of process 800 may be performed by a device or collection of devices separate from, or in combination with, user device 110.

As shown in FIG. 8, process 800 may include establishing a connection with a network associated with a merchant (block 805) and registering with the network (block 810). Assume that a user, of user device 110, enters and/or approaches a premises associated with a merchant (e.g., such as a restaurant, a department store, etc.). For example, user device 110 may detect private network 160, associated with the merchant, and may establish a connection with private network 160 (e.g., a wireless fidelity (WIFI) network and/or some other type of network). In one example, user device 110 may send, to client server 140 (e.g., associated with the merchant) via private network 160, information associated with user device 110 (e.g., a device identifier, an IP address, etc.), information associated with the user (e.g., a username, password, PIN, etc.), information associated with the autotab application (e.g., an application identifier, etc.). Client server 140 may authenticate user device 110 based on the information received from user device 110 and may permit user device to connect to private network 160 based on a successful authentication. Client server 140 may deny access to private network 160 based on a determination that user device cannot be authenticated.

Alternatively, or additionally, user device 110 may register with client server 140 based on a determination that user device 110 is located within the premises, is located at a particular position within the premises, is being serviced by a particular attendant (e.g., a server, a hostess, a cashier, a service agent, etc.) associated with the merchant, etc. In one example, a location associated with user device 110 may be based on location information sent by user device 110 to client server 140. In another example, a location of user device 110 may be identified when the user uses user device 110 to scan a bar code, an RFID tag, and/or another device associated with a particular position (e.g., a particular table number) and/or a particular attendant associated with the merchant. Client server 140 may register user device 110 based on information associated with the location of user device 110 and may, based on the registration, establish an account, associated with user device 110, that corresponds to the particular position and/or an attendant.

As also shown in FIG. 8, process 800 may include displaying an autotab menu UI associated with the merchant (block 815). For example, client server 140 may retrieve information relating to products and/or services associated with the merchant (e.g., a restaurant menu, a catalog, etc.) and may send, to user device 110, the information relating to the products and/or services. User device 110 may receive the information and the autotab application may display the information on user device 110, via an autotab menu UI (e.g., autotab menu UI 700 of FIG. 7A).

As further shown in FIG. 8, process 800 may include submitting information associated with an order and receiving an indication that the order was placed (block 820). For example, a user, of user device 110, may review the products and/or services (e.g., menu items) associated with the merchant and may select a product and/or service associated with an order. In one example implementation, an attendant associated with the merchant may submit information associated with the selected product and/or service to client server 140. In another example implementation, the user may select the product and/or service by touching the product and/or service via the autotab menu UI. The autotab application may, for example, receive information associated with the selected product and/or service via the autotab menu UI and may send the information associated with the selected product and/or service to client server 140 via private network 160.

Client server 140 may receive the information associated with the selected product and/or service and may send a notification that an order has been received and/or processed. User device 110 may receive the indication and may display an indication, via the autotab menu UI, that the order has been received and/or processed by client server 140.

Client server 140 may send information, associated with the order, to user device 110. User device 110 may receive the information associated with the order and the autotab application may display the information, associated with the order, on user device 110 via an autotab payment UI (e.g., autotab payment UI 730 of FIG. 7B). The information associated with the order may include information associated with a date and/or time, information associated with the particular position (e.g., a table number), and/or information associated with the attendant servicing the user (e.g., a name associated with the attendant). The information associated with the order may also, or alternatively, include the selected product and/or service, a respective price associated with each of the selected product and/or service, a value associated with a sum of the respective price associated with each of the selected product and/or service, a value associated with a quantity of tax based on the subtotal and a tax rate, a value associated with the tax rate used to determine the quantity of tax and a value associated with a total price associated with the order. The total price associated with the order may be based on the value associated with the subtotal, the value associated with the quantity of tax, and/or a value associated with a quantity of gratuity that may be entered, by the user, into the autotab payment UI.

As yet further shown in FIG. 8, if an alert is received (block 825—YES), then process 800 may include sending a notification to the network (block 830). For example, the user, of user device 110, may review the order and may identify a mistake in the order and/or may desire to change the order (e.g., by adding, changing, and/or removing a selected product and/or service) identified in the autotab payment UI. The autotab application may receive an instruction, via the autotab payment UI, to send a notification to client server 140 indicating that the order is to be changed when the user selects an alert attendant button (e.g., alert attendant button 762 of FIG. 7B). In one example, client server 140 may receive the notification and may notify the particular attendant by displaying a notification indicating that the order, associated with the particular position (e.g., table number), is to be changed. The particular attendant may obtain information associated with the change from the user and may submit the information associated with the change to client server 140. In another example, client server 140 may receive the notification and may change the order based on changes to the order identified in the notification.

Based on the changed order, client server 140 may send information associated with the changed order to user device 110. User device 110 may receive the information associated with the changed order and the autotab application may display the information, associated with the changed order, on user device 110 via the autotab payment UI (e.g., autotab payment UI 730 of FIG. 7B).

As still further shown in FIG. 8, if an alert is not received (block 825—NO), then process 800 may include receiving a gratuity value via an autotab payment UI, and/or determining a total price (block 835). For example, the user, of user device 110, may review the order and may enter, via the autotab payment UI, a value associated with a quantity of gratuity to be applied to the order. The autotab application may receive the value associated with the gratuity, via the autotab payment UI, and may calculate a value associated with a total price associated with the order based on the value associated with the subtotal, the value associated with the quantity of tax, and/or the value associated with the quantity of gratuity. The autotab application may display, via the autotab payment UI, the value associated with the total price associated with the order.

In another example implementation, the autotab payment UI may include menu items associated with the user as well as menu items associated with another user of another user device 110. The user may select the menu items associated with the user and the autotab application may generate and/or display an updated the autotab payment UI based on the selected menu items associated with the user. The user may, in the manner similar to that described above, enter a quantity of gratuity associated with the updated payment UI and the autotab application may update the total price based on the quantity of gratuity associated with the updated payment UI.

In yet another example implementation, when generating the updated autotab payment UI, the autotab application may cause user device 110 to communicate with the other user device 110 (e.g., via a point-to-point network, such as Bluetooth network, via an instant messaging protocol via the Internet, etc.) to settle and/or negotiate the order. For example, user device 110 may send information associated with the selected menu items associated with the user to the other user device 110, which may permit the other user to verify that the menu items that are not selected belong to the other user. If the other user rejects one or more menu items that are not selected, the user may negotiate the order by selecting other menu items to be communicated to the other user device 110 until the bill is settled. When the bill is settled, the user may, in the manner similar to that described above, enter a quantity of gratuity associated with an updated payment UI that permits the autotab application to update the total price. Alternatively, or additionally, the other user may, in the manner similar to that described above, enter a quantity of gratuity associated with another updated payment UI displayed on the other user device 110 and another autotab application, hosted by the other user device 110, may update the total price based on the quantity of gratuity associated with the other updated payment UI.

As also shown in FIG. 8, process 800 may include receiving an indication that the bill is to be paid (block 840) and sending payment information to be processed (block 845). For example, the autotab application may receive an indication that the total price associated with the order is to be paid when the user selects a pay bill button (e.g., pay bill button 764 of FIG. 7B) on the autotab payment UI. In another example implementation, the autotab application may receive an indication that the total price associated with the order is to be paid when the user selects an autotab icon (e.g., autotab icon 562 of FIG. 7B) and moves the autotab icon to a location on a desktop associated with user device 110 (e.g., desktop 550 of FIG. 5B) that coincides with a location within boundaries associated with the autotab payment UI.

Based on the indication that the total price, associated with the order, is to be paid, the autotab application may, for example, retrieve payment information from a memory associated with user device 110. The autotab application may process the payment information by decrypting the payment information in a manner that can be received and/or processed by client server 140 and/or financial server 130. For example, the autotab application may send the payment information to client server 140 via private network 160. In another example, the autotab application may send the payment information to financial server 130 via network 150 (e.g., the Internet and/or some other network). In this example, financial server 130 may be associated with, and/or provide access to, a service (e.g., such as PAYPAL®, etc.) that processes payment information associated with a credit and/or debit card, a bank account withdrawal, an electronic check, and/or other forms of payment. The autotab application may, for example, send the payment information, to client server 140 and/or financial server 130, in a secure manner (e.g., using a secure tunneling protocol, transmitting encrypted payment information, etc.).

In another example, implementation, the autotab application may determine that the total price to be paid is greater than a threshold and may display a notification indicating that the total price to be paid is greater than the threshold. In one example, the autotab application may not perform the automatic tab payment operation. In another example, the autotab application may perform the autotab payment operation when an instruction is received, from the user and via the autotab payment UI, to perform the automatic tab payment operation (e.g., an instruction to override the feature that causes a the operation not to be performed).

As further shown in FIG. 8, process 800 may include receiving information indicating that payment was processed (block 850) and displaying, via an autotab confirmation UI, the information indicating that the payment was processed (block 855). For example, client server 140 may receive the payment information and may send the payment information to financial server 130 to process the payment information. The payment information may include a credit and/or debit card number, an expiration date, a name associated with an authorized user (e.g., a name associated with the user of user device 110), a billing address associated with the authorized user, etc. Financial server 130 may receive the payment information and/or all or a portion of the information associated with the order and may determine whether the payment information is valid. Based on a determination that the payment information is valid, financial server 130 may process the payment informant and may send a notification to client server 140 that the payment information was successfully processed. In another example, if financial server 130 is unable to validate the payment information, then financial server 130 may send a notification, to client server 140, indicating that the payment information could not be processed.

In another example implementation, user device 110 may send the payment information to financial server 130 to be processed. In this example, the payment information may include information associated with the order, which includes information that identifies the merchant with which the order was placed and/or an address associated with client server 140. Financial server 130 may process the payment information and may send a notification to client server 140 indicating that the payment information was processed or that the payment information could not be processed.

Client server 140 may receive the notification that the payment was successfully processed and may generate information associated with a payment receipt that corresponds to the order, which indicates that the payment information was successfully processed. Client server 140 may send the information associated with a payment receipt to user device 110 which may indicate that the payment information was successfully processed. In another example, if client server 140 receives a notification that the payment information could not be processed, then client server 140 may send a notification to user device 110 indicating that the payment information could not be processed.

User device 110 may receive the indication that the payment information could not be processed and the autotab application may automatically send other payment information retrieved from the memory associated with user device 110 and/or processed in the manner similar to that described above (e.g., with respect to block 845). In another example, the autotab application may display a notification for the user to provide the attendant with another form of payment.

In yet another example, the autotab application may display a notification that instructs the user to identify which other payment information stored in the memory that the autotab application is to process and/or send to client server 140 and/or financial server 130.

User device 110 may receive the information associated with the payment receipt that corresponds to the order and may display all or a portion of the information associated with the payment receipt via an autotab receipt UI (e.g., autotab receipt UI 770 of FIG. 7C). The autotab receipt UI may indicate that the payment information was processed using the payment information. The autotab receipt UI may include proof of payment (e.g., a transaction number and/or some other proof of payment) associated with the processing of the payment information. The transaction number may be used when the user is reviewing statements associated with the payment information (e.g., a bank statement, credit card statement, etc.) and/or while communicating with another financial server 130 (e.g., associated with a bank and/or a financial institution associated with the method of payment used to pay for the order). The autotab receipt may also include the method of payment, all or a portion of an number and/or identifier associated with the method of payment (e.g., a credit and/or debit card number, an bank account number, bank routing number, etc.), an expiration date associated with the method of payment, and/or an indication of an amount that was paid as a result of processing the payment information. The autotab receipt UI may further include all or a portion of the information associated with the autotab payment UI.

The foregoing description provides illustration and description, but is not intended to be exhaustive or to limit the implementations to the precise form disclosed. Modifications and variations are possible in light of the above teachings or may be acquired from practice of the embodiments.

While a series of blocks has been described with regard to FIGS. 6 and 8, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Further, certain portions, described above, may be implemented as a component or logic that performs one or more functions. A component or logic, as used herein, may include hardware, such as a processor, an ASIC, or a FPGA, or a combination of hardware and software (e.g., a processor executing software).

It should be emphasized that the terms "comprises" and "comprising," when used in this specification, are taken to specify the presence of stated features, integers, steps or components but do not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A user device, comprising:
 a memory to store payment information that enables a user, of the user device, to pay for a product or service using a credit card, a debit card, or a bank account, wherein the payment information is stored securely, so as not to be accessible to another user of another user device; and
 a processor configured to:
  receive, from a server device associated with a merchant, information associated with a menu of items offered for sale by the merchant, wherein the information associated with the menu of items permits a user, of the user device, to place an order, wherein the order includes at least one item of the menu of items,
  receive, from the server device, information associated with the order, wherein the information associated with the order includes an indication of the at least one item and a price associated with the at least one item,
  receive, from the user, an instruction to pay for the order,
  retrieve, from the memory and in response to the instruction to pay for the order, the payment information to be used to pay the price associated with the at least one item,
  send, to the server device, the payment information to permit the server device to process the payment information to pay for the order, wherein the sending is performed in a manner that does not permit an attendant, associated with the merchant, to access the payment information,
  receive, from the server device, an indication that the payment information was processed;
  receive, from another user device, a notification that a copy of the payment information, stored on the other user device, is to be processed to pay for another order associated with a price that is greater than a threshold,
   wherein another user, associated with the other user device, is an authorized user of the payment information up to the threshold, and
   wherein the notification includes a request to authorize the payment of the other order using the copy of the payment information;
  receive, from the user, an indication that the payment of the other order, using the copy of the payment information, is not authorized; and
  send, to the other user device, another notification that the payment of the other order is not authorized based on the indication that the payment of the other order is not authorized.

2. The user device of claim 1, wherein the processor is further configured to:
   establish a connection with the server device via a private network associated with the server device, wherein establishing the connection occurs when the user enters a premises associated with the merchant, and
   register with the server device in order to receive the information associated with the menu of items offered for sale by the merchant.

3. The user device of claim 1, wherein, when receiving the instruction to pay for the order, the processor is further configured to:
   present the information associated with the order for display via a payment user interface;
   receive, via the payment user interface, a value associated with a quantity of gratuity associated with the order; and
   calculating a total price associated with the order based on a sum of the price associated with the at least one item, a quantity of tax that corresponds to the price associated with the at least one item, and the value associated with the quantity of gratuity.

4. The user device of claim 3, wherein the processor is further configured to:
   present, for display on the user device, another payment UI based on information associated with another order received from the server device, wherein the other payment UI includes a selection of one or more other items, and
   receive, via the other payment UI, an instruction that the other order needs to be changed, and
   send another notification to the server device that indicates that the order needs to be changed.

5. The user device of claim 1, wherein the processor is further configured to:
   send other payment information, to another server device and via a public network, to be processed, by the other server device, to pay for another order, wherein the other server device provides or enables access to a service that processes payment information; and
   receiving, from the server device, another indication that the payment information was processed based on a notification sent from the other server device to the server device indicating that the payment information, corresponding to the other order, was processed.

6. The user device of claim 1, wherein the notification includes one or more of an email message or an instant message.

7. A non-transitory computer-readable memory device that stores instructions executable by at least one processor, the computer-readable memory device comprising instructions for:
   receiving, from a server device associated with a merchant, information associated with items offered for sale by the merchant, wherein the information associated with the items permits a user, of a user device, to place an order associated with the merchant, wherein the order includes at least one item of the items;
   receiving, from the server device, information associated with the order, wherein the information associated with the order includes an indication of the at least one item and a price associated with the at least one item;
   receiving, from the user, an instruction to pay for the order;
   retrieving, in response to the instruction to pay for the order, payment information to be used to pay the price associated with the at least one item;
   sending, to the server device, the payment information to permit the server device to process the payment information to pay for the order, wherein the sending is performed in a manner that does not permit an attendant associated with the merchant to access the payment information;
   receiving, from the server device, an indication that the payment information was processed;
   receiving, from another user device, a notification that a copy of the payment information, stored on the other user device, is to be processed to pay for another order associated with a price that is greater than a threshold,
      wherein another user, associated with the other user device, is an authorized user of the payment information up to the threshold, and
      wherein the notification includes a request to authorize the payment of the other order using the copy of the payment information;
   receiving, from the user, an indication that the payment of the other order, using the copy of the payment information, is not authorized; and
   sending, to the other user device, another notification that the payment of the other order is not authorized based on the indication that the payment of the other order is not authorized.

8. The non-transitory computer-readable memory device of claim 7, further comprising instructions for:
   connecting to the server device, associated with the merchant, via a private network associated with the server device; and
   sending, to the server device and as a result of the connecting, information regarding a location, within a premises associated with the merchant, that the user device is located that enables the server device to create an order.

9. The non-transitory computer-readable memory device of claim 7, further comprising instructions for:
   sending other payment information, to another server device and via a public network, to be processed, by the other server device, to pay for another order, wherein the other server device provides or enables access to a service that processes payment information; and
   receiving, from the server device, another indication that the payment information was processed based on a notification sent from the other server device to the server device indicating that the payment information, corresponding to the other order, was processed.

10. The non-transitory computer-readable memory device of claim 7, further comprising instructions for:
    receiving, from the server device, information associated with another order that includes a first item, of the items, associated with the user and a second and third item, of the items, associated with the other user of the other user device;
    receiving a selection of the first item from the user; and
    retrieving the payment information to be used to pay for a portion of the other order that corresponds to the first item.

11. The non-transitory computer-readable memory device of claim 10, further comprising instructions for:
    sending, to the other user device, an indication that the first item was selected;
    receiving, from the other user device, an indication that the third item was selected by the other user of the other user device;
    receiving another selection of the first item and the second item from the user; and sending, to the server device, the payment information to pay for a portion of the other order that corresponds to the first item and the second item.

12. The non-transitory computer-readable memory device of claim 7, further comprising instructions for:
receiving an instruction to send the payment information, to the server device, to pay for another order;
determining that a price, associated with the other order, is greater than a threshold; and
displaying a notification that the payment information is not to be sent based on the determination that the price, associated with the other order, is greater than the threshold.

13. A method performed by a user device, comprising:
establishing a connection to a server device associated with a merchant, wherein the connection is established via a private network associated with the server device;
receiving, from the server device, information associated with a plurality of products or services that are offered for sale by the merchant;
receiving, from a user of the user device, selection of a product or service of the plurality of products or services;
sending, to the server device, information, associated with the selection of the product or service, that is to be included in an order associated with a location;
receiving, from the server device, information associated with the order that includes a price associated with the order;
retrieving payment information from a memory associated with the user device, wherein the payment information is to be used to pay the price associated with the order;
sending, to the server device, the payment information for the price associated with the order, wherein the payment information is sent in a manner that is not accessible by a service attendant, associated with the merchant, that provides services to the user;
receiving, from another user device, a notification that a copy of the payment information, stored on the other user device, is to be processed to pay for another order associated with a price that is greater than a threshold,
wherein another user, associated with the other user device, is an authorized user of the payment information up to the threshold, and
wherein the notification includes a request to authorize the payment of the other order using the copy of the payment information;
receiving, from the user, an indication that the payment of the other order, using the copy of the payment information, is not authorized; and sending, to the other user device, another notification that the payment of the other order is not authorized based on the indication that the payment of the other order is not authorized.

14. The method of claim 13, further comprising:
sending, to the server device via the connection, information regarding the location, within a premises associated with the merchant where the user device is located, that enables the server device to create the order associated with the location,
wherein establishing a connection to the server device further includes scanning an item, associated with the location within the premises, that enables the information regarding the location to be obtained by the user device.

15. The method of claim 14, wherein the item includes bar code information or radio frequency identification (RFID) information.

16. The method of claim 14, wherein receiving the information, associated with the plurality of products or services, further includes:
presenting the information associated with the plurality of products or services for display via a menu user interface, wherein the menu user interface includes the information regarding the location within the premises.

17. The method of claim 13, wherein receiving the selection of the product or service, includes:
receiving an instruction to associate the selection of the product or service with the order.

18. The method of claim 13, further comprising:
presenting the information associated with the order for display via a payment user interface.

19. The method of claim 13, wherein retrieving the payment information from the memory, further includes:
receiving an instruction to pay the price associated with the order, wherein the instruction is received when the user:
selects a particular button on a payment user interface, or
selects an icon, associated with the payment information, that is displayed on the user device and moves the icon to a location that is within one or more borders associated with the payment user interface.

20. The method of claim 13, comprising:
receiving, via a payment user interface, a value associated with a quantity of gratuity associated with the order; and
calculating a total price associated with the order based on a sum of the price associated with the order, a quantity of tax that corresponds to the price associated with the order, and the value associated with the quantity of gratuity.

* * * * *